United States Patent [19]
Nosenchuck et al.

[11] Patent Number: 5,492,289
[45] Date of Patent: Feb. 20, 1996

[54] LIFTING BODY WITH REDUCED-STRENGTH TRAILING VORTICES

[75] Inventors: Daniel M. Nosenchuck, Mercerville; Garry L. Brown, Princeton, both of N.J.

[73] Assignee: British Technology Group USA Inc., Gulph Mills, Pa.

[21] Appl. No.: 247,402

[22] Filed: May 23, 1994

Related U.S. Application Data

[63] Continuation of Ser. No. 874,706, Apr. 28, 1992, abandoned.

[51] Int. Cl.$^6$ ............................ B64C 21/10; B64C 21/00
[52] U.S. Cl. .................... 244/204; 244/35 R; 244/199; 244/200
[58] Field of Search ............................ 244/45 R, 35 R, 244/199, 198, 200, 204, 207, 130

[56] References Cited

U.S. PATENT DOCUMENTS

| | | | |
|---|---|---|---|
| 2,074,201 | 3/1937 | Bechereau | 244/91 |
| 3,005,496 | 10/1961 | Nichols | 244/207 |
| 3,085,740 | 4/1963 | Wagner | 244/207 |
| 3,090,584 | 5/1963 | Kuchemann et al. | 244/199 |
| 3,471,107 | 10/1969 | Ornberg | 244/199 |
| 3,712,564 | 1/1973 | Rethorst | 244/199 |
| 3,881,669 | 5/1975 | Lessen | 244/130 |
| 3,936,013 | 2/1976 | Yuan | 244/199 |
| 3,937,594 | 2/1976 | Ito et al. | 244/35 R |
| 4,046,336 | 9/1977 | Tangler | 244/198 |
| 4,108,403 | 8/1978 | Finch | 244/199 |
| 4,293,110 | 10/1981 | Middleton et al. | 244/199 |
| 4,697,769 | 10/1987 | Blackwelder et al. | 244/199 |
| 4,802,642 | 2/1989 | Mangiarotty | 244/204 |
| 4,913,381 | 4/1990 | Mabey | 244/199 |
| 4,949,919 | 8/1990 | Wajnikonis | 244/45 R |
| 5,213,287 | 5/1993 | Barron | 244/199 |

OTHER PUBLICATIONS

Donaldson, C., et al., "Vortex Wakes of Conventional Aricraft", AGARDograph No. 204, NATO Adv. Grp. for Aerospace R & D, May 1975.
Lee H., "Computational and Experimental Study of Trailing Vortices", Ph.D. Thesis for Virginia Polytechnic Institute, Apr. 1983.
Leonard, A., "Computing Three–Dimensional Incompressible Flow With Vortex Elements", Annual Review of Fluid Mechanics, pp. 523–559, vol. 17, 1985.
Staufenbiel, R., et al., "On Aircraft Wake Properties and Some Methods for Stimulating Decay and Breakdown of Tip Vortices", NATO Adv. Grp. for Aerospace R & D, Jul 1991.
Nosenchuck, D., et al., "Submarine Sail Trailing Vortex Simulation and Control", Dept. of Mech. & As. Eng., Princeton University, Princeton, NJ 08544, Sep. 1991.
Nosenchuck, D., et al., "Control of Wing–tip Vortices", FAA Int'l Wake Vortex Symposium, Oct. 1991.
Barnes W. McCormick Aerodynamics, Aeronautics and Flight Mechanics pp. 130–139 1979.

*Primary Examiner*—Andres Kashnikow
*Assistant Examiner*—Virna Lissi Mojica
*Attorney, Agent, or Firm*—Fitzpatrick, Cella, Harper & Scinto

[57] ABSTRACT

A lifting body moves relative to a fluid, thereby creating a vortex field in the fluid downstream of the lifting body. The lifting body has a predetermined lift distribution along the length thereof which enhances the velocity component of the fluid flow directed outwardly from the centroid of the vortex field to reduce the strength of trailing vortices. In a preferred embodiment, the lifting body is a wing with a perturbation proximate to the tip end of the wing planform trailing edge.

19 Claims, 9 Drawing Sheets

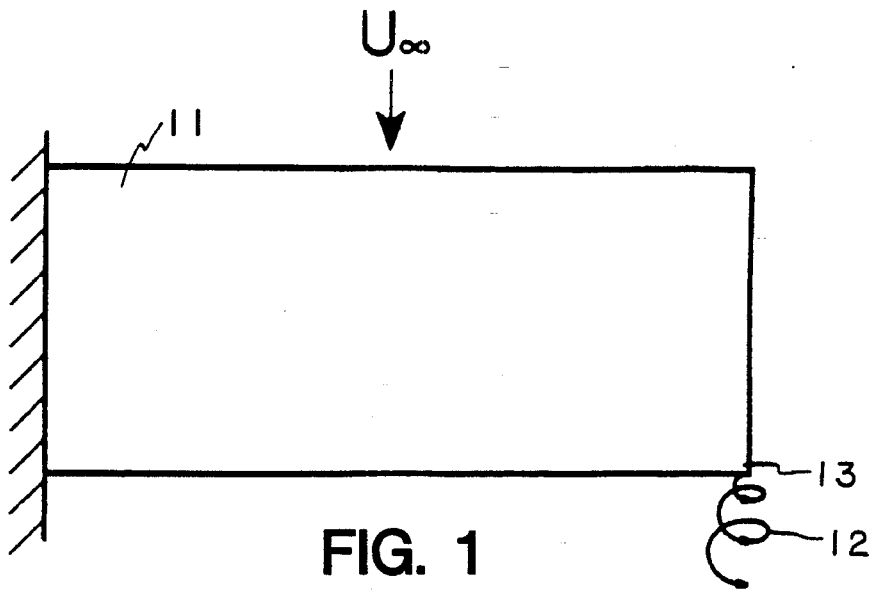
FIG. 1
PRIOR ART
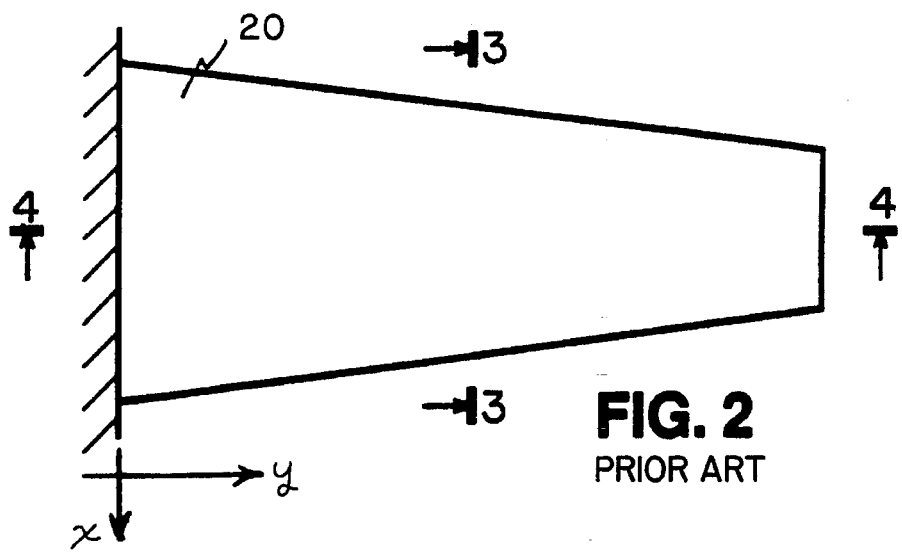
FIG. 2
PRIOR ART
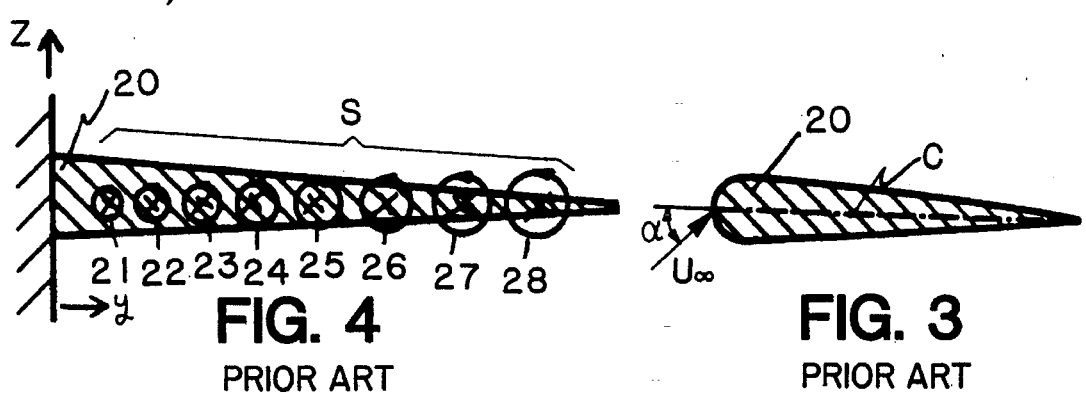
FIG. 4
PRIOR ART
FIG. 3
PRIOR ART 5,492,289

1

LIFTING BODY WITH REDUCED-STRENGTH TRAILING VORTICES

This application is a continuation of application Ser. No. 07/874,706 filed Apr. 28, 1992, now abandoned.

BACKGROUND OF THE INVENTION

1. Field of the Invention

The present invention relates to lifting bodies and, more particularly, to both aerodynamic (e.g., wings, rotors, flaps, control surfaces) and hydrodynamic (e.g., submarine sails, bow-planes, stern appendages, propellers) lifting bodies with rapidly dissipated trailing longitudinal vortices.

2. Description of the Prior Art

Wing geometry plays an important role in the development of lift in both aerodynamic and hydrodynamic craft. When air or liquid flows over a wing surface, various turbulent flows occur. An increased understanding of the complex underlying structure in these various turbulent flows has led to some level of their control. The importance of controlling these turbulent flows can be appreciated by considering some examples.

In aircraft, the formation of strong longitudinal vortices, especially behind heavy aircraft developing large lift coefficients, causes large induced transverse wake velocities in the vortices. These vortices thus cause large disturbances after an aircraft has lifted off or landed, and the large airflow velocities in these disturbances can present extremely hazardous conditions for other aircraft subsequently landing or taking off. Accordingly, the Federal Aviation Administration has mandated minimum separation times between consecutive takeoffs and/or landings and minimum distances between aircraft in flight.

In ships, particularly those in which noise reduction is important, such as submarines, trailing vortices can be a significant noise source. For example, the ship's propeller blades can trail vortices, which is a source of noise. In addition, large vortices that can sometimes trail from a submarine sail in certain maneuvers not only create significant noise in themselves but also can affect the flow through the ship's propeller disc and create easily detected secondary noise.

FIGS. 1 to 4 illustrate the phenomenon of trailing vortices. When fluid flows around a lifting body such as a wing, a vortex field is created in the flow trailing the wing. With a rectangular wing 11, such as that shown in FIG. 1, travelling relative to a fluid at a velocity of $U_{2s}$, a single strong longitudinal vortex 12 trails the tip end 13 of the wing.

In a tapered wing 20, such as that shown in FIG. 2, the chord c varies along the length of the wing (along the y-axis), which can be appreciated from FIG. 3. This variation can be expressed as a function c(y). As is well known, the lift L generated by an airfoil depends on the length of the chord and the angle of attack $\alpha$ of the chord relative to the velocity vector $U_{2s}$, which will vary along the length of the wing in a twisted wing. Therefore, the lift L varies along the length of the wing, which can be expressed as a function L(y), and causes formation of a vortex field. This is essentially a "vortex sheet" S, consisting of a continuous series of vortices represented for illustrative purposes as individual vortices 21–28 extending along and from the trailing edge of the wing in the +x direction as shown in FIG. 4. The vorticity in this vortex sheet increases near the tip of the wing 20

2

(represented by larger circles in FIG. 4) and tends to combine downstream of the trailing edge of the wing, a process often visualized as "rolling up" of the vortex sheet. This is depicted schematically in FIG. 5.

The properties of the fluid flow within this trailing vortex field are generally known to those skilled in the art, and have been described extensively in many reference works, among them C. duP. Donaldson and A. J. Bilanin, "Vortex Wakes of Conventional Aircraft," AGARDograph No. 204, NATO Advisory Group for Aerospace Research and Development, Technical Editing and Reproduction Ltd., London, 1975, and Lee, H., "Computational and Experimental Study of Trailing Vortices," Ph.D. Thesis for Virginia Polytechnic Institute, 1983, available from University Microfilms International, Ann Arbor, Mich.

The fluid velocities induced by this vortex field S, and the resulting hazardous flight conditions or noise, depend on the strength and spatial distribution of the vortices that form as the vortex sheet rolls up. If the vortices can be properly modified, the vortex field will quickly dissipate.

Various approaches have been taken to modify the trailing vortices. One such approach, discussed in Donaldson and Bilanin, is shown in FIG. 6(a), in which a spline device depicted in FIG. 6(a') is located on the aircraft a certain distance behind the trailing edge of the wing for breaking up the vortex after it has formed. Another approach discussed in Donaldson and Bilanin is shown in FIG. 6(b), in which spoilers are positioned at specific locations on the wing.

However, the above-noted approaches add to the overall weight of the aircraft and negatively impact the aerodynamics of the wing by increasing drag. In addition, there is the possibility that even though the vortex sheet may be disturbed initially, it was not always certain whether the instability persisted further downstream of the trailing edge of the wing or if the flow reorganized into a tight vortex.

Donaldson & Bilanin also discuss redistribution of the lift along the wing so that more lift is generated at outboard sections of the wing (toward the wing tip) than toward the inboard sections. While this does not have the drag penalty associated with the other approaches, it does create substantial complexities in providing wing structure because generating more lift at the wing tip requires the wing to be made stronger and therefore heavier.

Other approaches have included modifying the wing planform providing notches in the trailing edge of the main part of the wing in an attempt to disrupt the formation of the vortex sheet.

None of these prior art approaches have resulted in significantly hampering the rolling-up process or significantly increasing the redistribution of the trailing wing-tip vortex sheet formed thereby.

SUMMARY OF THE INVENTION

It is an object of the present invention to reduce the vorticity concentration in the vortex field trailing a lifting body.

In accordance with an aspect of the invention, a lifting body for moving relative to a fluid, thereby creating a vortex field in the fluid downstream of the lifting body, has a predetermined lift distribution along its length to enhance the velocity component of fluid flow directed outwardly from the centroid of the vortex field.

In accordance with other aspects of the invention, the predetermined lift distribution is provided by variations in the chord length of the lifting body along its length or by twisting the lifting body to vary its angle of attack relative to the fluid medium or both.

In accordance with yet another aspect of the invention, the chord length variation is provided by incorporating a perturbation in the planform of the lifting body proximate to a tip end thereof.

BRIEF DESCRIPTION OF THE DRAWINGS

The various aspects of the present invention can be best understood by reference to the detailed description of preferred embodiments set forth below taken with the drawings, in which:

FIG. 1 depicts the planform of a conventional rectangular untapered wing.

FIG. 2 depicts the planform of a conventional tapered wing.

FIG. 3 depicts the transverse cross-section of the wing in FIG. 2.

FIG. 4 depicts the longitudinal cross-section of the wing in FIG. 2.

DETAILED DESCRIPTION OF PREFERRED EMBODIMENTS

Figure 5:
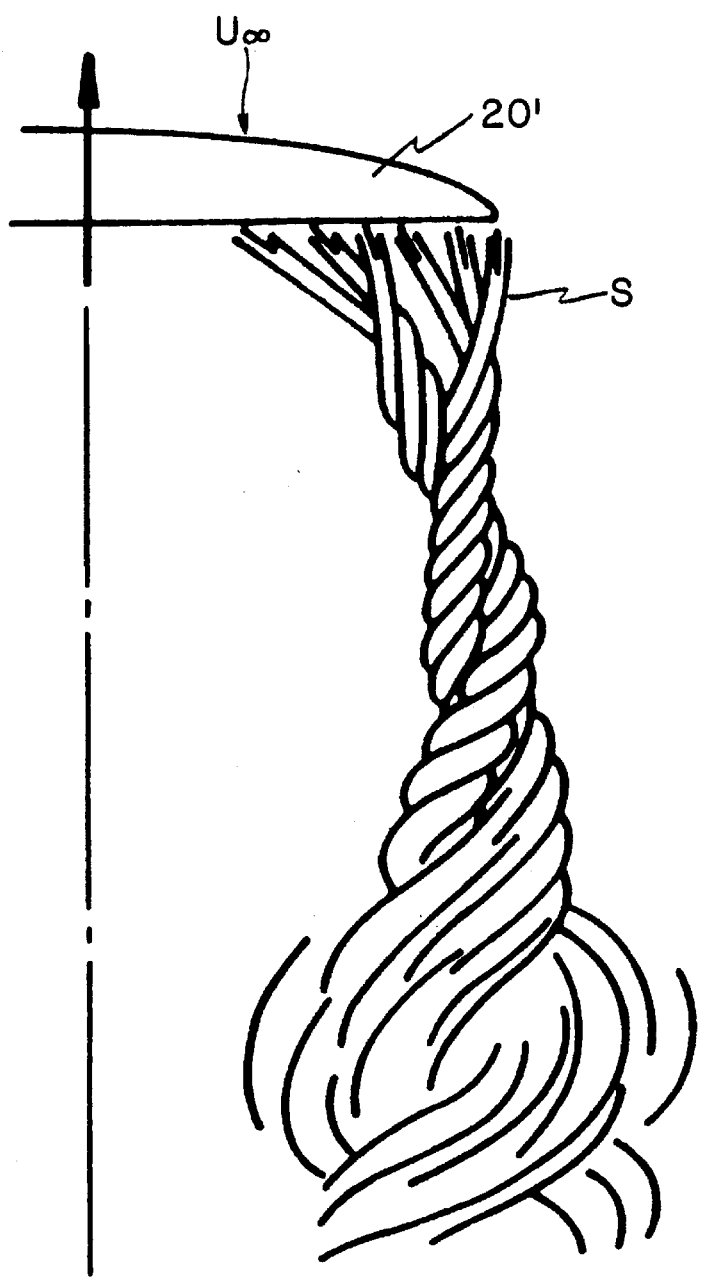
FIG. 5 is a pictorial representation of the vortex sheet rollup behind the tapered wing of FIG. 2.
Figure 6A:
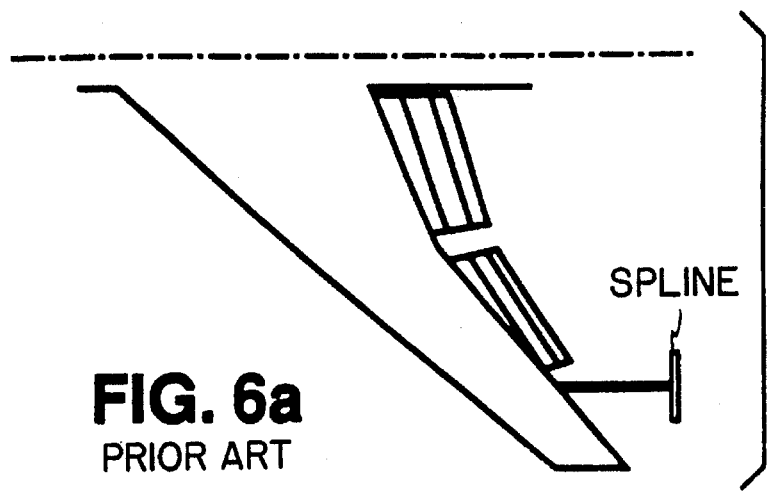
FIGS. 6(a), 6(a') and 6(b) are prior art arrangements for dissipating trailing vortices from a wing.
Figure 6A:
Figure 6B:
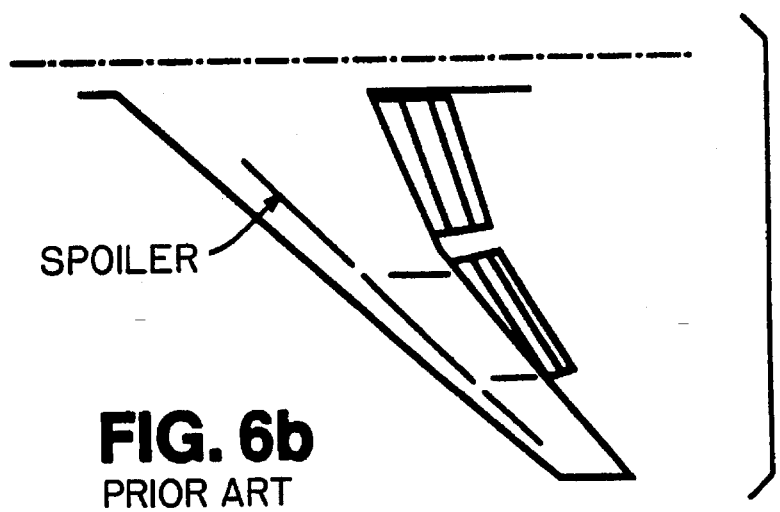
Figure 7A:
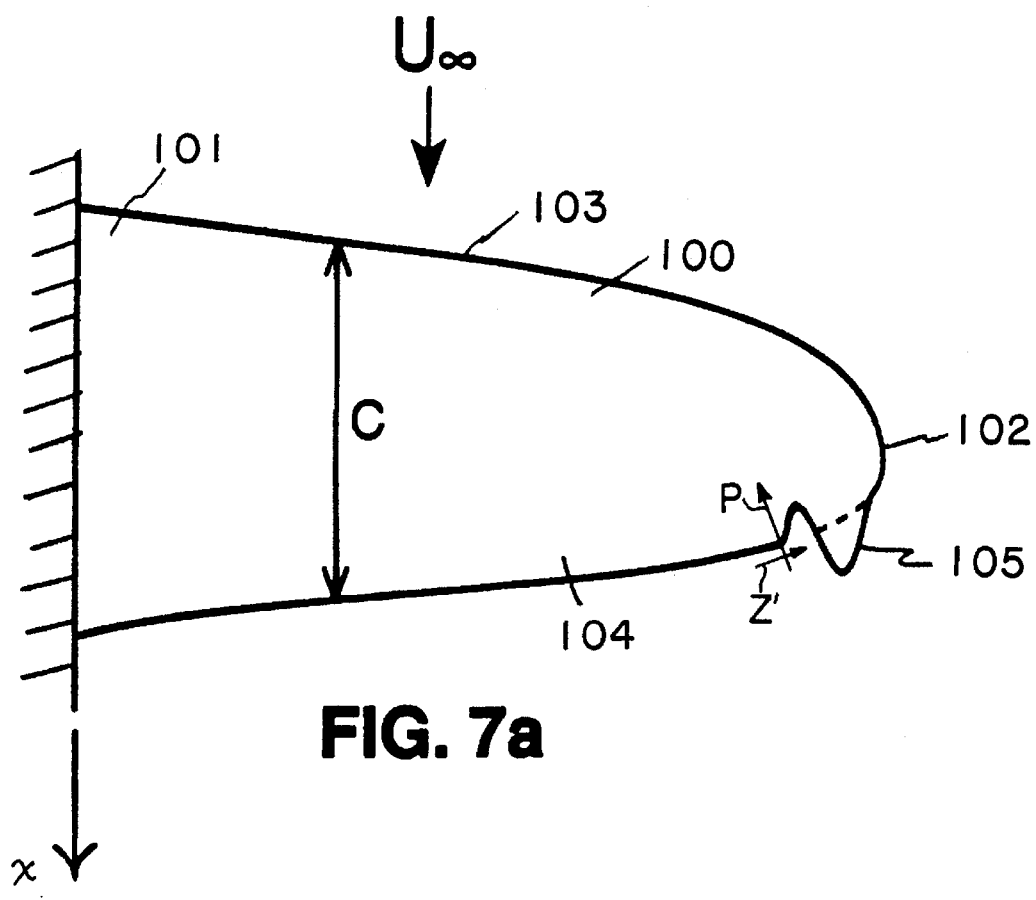
FIGS. 7(a) shows an embodiment of the present invention which comprises a tapered wing having a perturbation provided at the trailing edge of the wing and FIG. 7(b) shows the circulation $\Gamma$ along the length of the wing.

FIG. 7(a) is a planform of a tapered wing 100 incorporating a preferred embodiment of the invention.

Figure 7B:
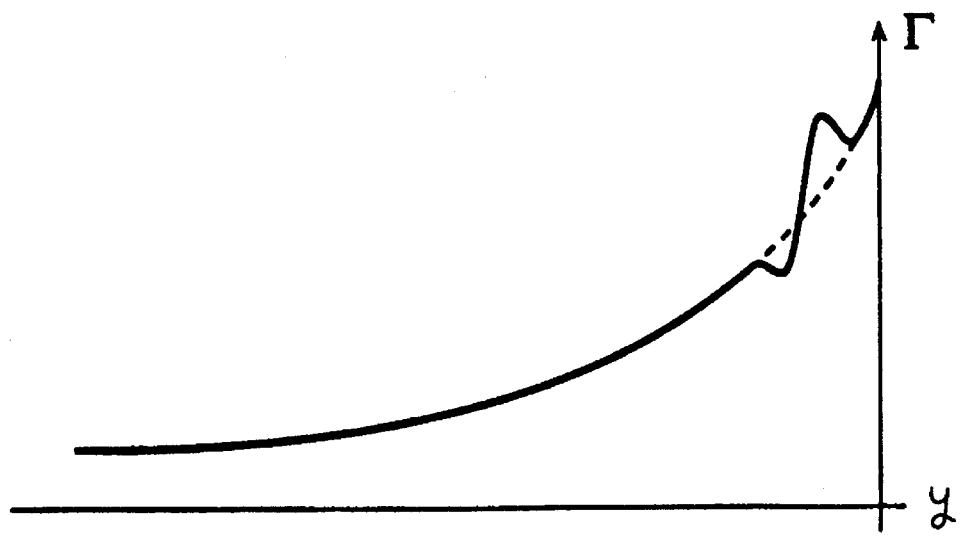

FIG. 7(b) plots the circulation $\Gamma$ in the (x-z) plane along the wing in the y-direction in FIG. 7(a) when the wing is in a fluid medium and there is relative motion between the medium and the airfoil. The dotted lines in FIGS. 7(a) and 7(b) represent the prior art.

As those skilled in the art know, lift (L) is related to $\Gamma$ as follows:

$$L \propto \int \Gamma(y) dy \quad (1)$$

or, rearranging Equation (1)

$$\Gamma(y) \propto \frac{dL(y)}{dy} \quad (2)$$

Therefore, changing the lift distribution L(y) along the airfoil will change $\Gamma(y)$. The function $\Gamma(y)$ is a measure of the longitudinal vorticity distribution along the length of the wing.

The present invention provides a lifting body having a configuration such that its lift distribution L(y) generates a longitudinal vortex field in the fluid such that the velocity component in the (y-z) plane of the fluid flow directed outwardly at the centroid of the vortex field is enhanced. The centroid of the vortex field is found by integrating the vorticity throughout the vortex field to find the location and radius of an equivalent circle containing the average vorticity. This is done using the following relationships.

The circulation $\Gamma$ in the flow is related to the vorticity $\omega$ in the fluid in the x-direction, which can vary in the (y-z) plane, as follows:

$$\Gamma = \int_A \omega_x(y,z) dA \quad (3)$$

where $\Gamma$ is the circulation in an area A of the (y-z) plane incorporating all of the vorticity generated by the wing 100.

The coordinates of the centroid of the vortex field are found by the following equations:

$$y_c = \frac{\int_A y\omega_x(y,z)dydz}{\int_A \omega_x(y,z)dydz} \quad (4a)$$

$$z_c = \frac{\int_A z\omega_x(y,z)dydz}{\int_A \omega_x(y,z)dydz}$$

The radius of an equivalent vorticity (that is, equivalent to the total vorticity of the vortex field trailing the wing 100) satisfies the following relationship:

$$r_c^2 = \frac{\int_A \omega_x(y,z)[(y-y_c)^2 + (z-z_c)^2]dydz}{\int_A \omega_x(y,z)dydz} \quad (5)$$

It has been found that roll-up of the trailing vortices can be hampered, and that the vorticity in the trailing vortex field dissipated, if the rate of growth of $r_c$ in the x-direction is increased. The present invention accomplishes this by enhancing the velocity components of the fluid flow directed outwardly from the centroid of the vortex field.

It will be appreciated from Equations (1) to (5) that the properties of the equivalent vorticity field depend on the circulation distribution $\Gamma(y)$. Thus, by proper redistribution of the lift along the wing (that is, by changing the function L(y) appropriately), the vortex field can be affected to bring about the desired result. An advantage of the invention is that it may be possible in many cases to maintain the total lift unchanged while still affecting the vortex field in the desired fashion.

A particularly convenient way to change the lift distribution is to change the chord distribution c(y). That is, lift (l) per unit length along a wing is given by the following equation:

$$l = \rho U \gamma \quad (6)$$

where $\gamma$ is the circulation per unit length of the wing in the (x-y) plane.

Moreover, lift l for a thin airfoil can be expressed $$l \propto \rho U^2 C_L c \quad (7)$$

where $\rho$=fluid density, U=free stream fluid velocity (that is, U at$-\infty$), $C_L$=coefficient of lift and c=chord length.

Combining Equations 6 and 7:

$$\rho U \gamma \propto \rho U^2 C_L c \quad (8)$$

and simplifying $$\gamma \propto U C_L c \quad (9)$$

For thin airfoils $C_L = 2\pi\alpha$. Moreover, in a general case, U, $\alpha$ and c can all vary in the y-direction. Therefore, the circulation distribution $\Gamma(y)$ can be expressed as follows:

$$\Gamma(y) \propto \frac{d}{dy}[U(y)\alpha(y)c(y)] \quad (10)$$

Equation 10 demonstrates that appropriately manipulating the chord length distribution c(y) or angle of attack distribution $\alpha(y)$, or both, enables the adjustment of the circulation distribution $\Gamma(y)$. With the proper such adjustment, the resulting vortex field will have the desired properties.

In the preferred embodiment depicted in FIGS. 7(a) and 7(b), the wing 100 is a thin airfoil (that is, c is much greater than its thickness so that the effect of the wing's thickness on its lift properties is small) with a root end 101, where it is attached to an air craft, submarine or other craft, and a tip end 102 extending into the fluid medium. The leading edge 103 of the wing 100 by definition faces the fluid flowing over the wing. The trailing edge 104 of the wing 100 has a perturbation 105 incorporated in it to change the chord length at the trailing edge 104 proximate to the tip end 102 of the wing 100.

In one embodiment, this perturbation has the formula $p = a_o e^{-d_o z'^2} \sin kz'$, z' being the distance along a coordinate axis formed by the planform without the perturbation and P being the distance along an axis perpendicular to z', as depicted in FIG. 7(a). The parameters $a_o$, $d_o$ and k are chosen by the method discussed below to provide the proper lift distribution. The wing 100 with the perturbation 105 provides the $\Gamma(y)$ plot shown in FIG. 7(b). It will be appreciated that $\Gamma(y)$ for the perturbation is the derivative of the formula for the perturbation itself, in accordance with Equations 2 and 10.

The proper circulation distribution $\Gamma(y)$ will affect the resulting vorticity in the desired way. That is, the object of changing the circulation distribution is adjusting the vorticity as discussed above. It will be appreciated that the fluid flow in the three-dimensional vortex field trailing the prior art version of the wing 100 may have a net velocity component directed radially outwardly from the centroid of the vortex field.

That velocity component causes the vortex field, and the resulting concentrated vorticity that forms as the field rolls up, to grow in the radial direction as the distance from the trailing edge 104 increases. Stated another way, the radius of the equivalent vorticity, calculated as shown above in Equation 5, about the centroid of the vortex field increases in the x direction.

A particular preferred embodiment of the present invention locates the perturbation in the wing tip region because changes in the circulation distribution at that location will have the greatest effect, which can be appreciated from FIG. 7(b). For purposes of the present invention, the wing tip region will be defined as the part of the wing extending from $Y = Y_{tip}$ to Y=b (the end of the wing) such that $$0.5 \leq \frac{\int_{y_{tip}}^{b} \Gamma(y) dy}{\int_{o}^{b} \Gamma(y) dy} < 1.00$$

The present invention enhances the radially outward component of the fluid velocity so that the radius of the equivalent vorticity increases more quickly. That result can be achieved in any manner that appropriately changes the lift distribution L(y). For example, the prior art wing could be twisted in a predetermined manner to provide the desired lift distribution. (See Equation 10.) Stated mathematically, the angle of attack $\alpha$ is varied according to the formula $\alpha = \alpha_o + \alpha'(y)$, where $\alpha_o$ is the angle of attack at the wing root 101 and $\alpha'(y)$ is the increment by which $\alpha_o$ is changed over the length of the wing. Since $L \propto \alpha$, changing the angle of attack along the length of the wing will change the lift distribution.

Figure 8:
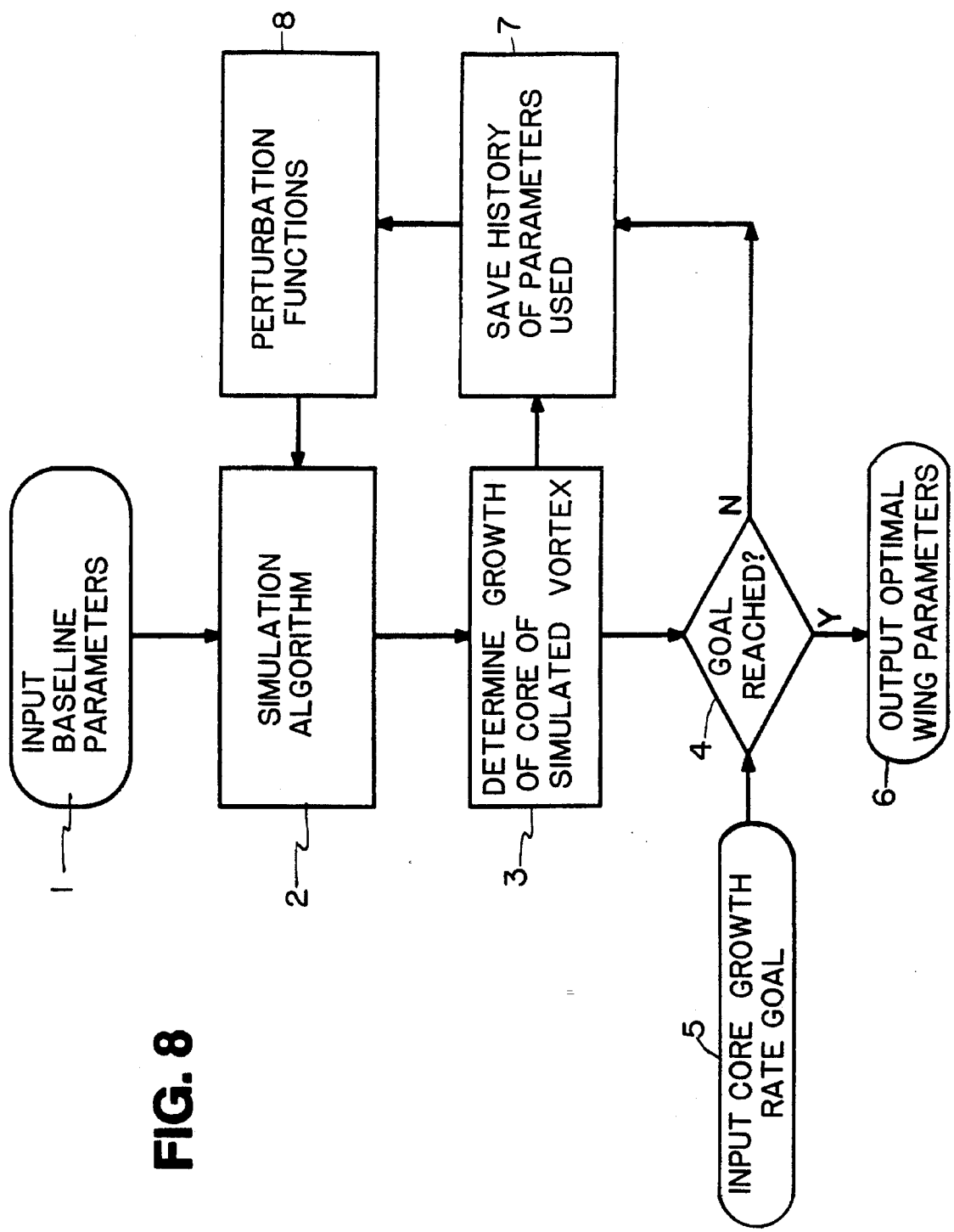
FIG. 8 is a flow chart used for determining optimal wing parameters.

FIG. 8 illustrates a method for calculating the configuration of the perturbation 105. A flow chart is followed for determining the optimal waveform, amplitude and spanwise position of the perturbation in the wing 100. This algorithm is actually used in such a way that baseline parameters of the geometry of a wing with a given perturbation are input and the vortex field which would result from that wing geometry is output. The shape of the perturbation in the wing is modified and the vorticity is recalculated for the modified wing geometry. This procedure is repeated until an optimal wing geometry is derived. In experiments, the optimal wing geometry was selected which would result in the growth of the equivalent radius $r_c$ to twice the equivalent radius for the same wing without the perturbation, at one half chord length downstream of the trailing edge of the wing.

In step 1, baseline wing geometry parameters, simulation parameters and constraints on the modifications which should be made to the wing are input. The baseline wing geometry parameters include the lengthwise chord distribution c(y), the mean-line distributions of lifting surfaces ml(x,y,z) and mean angle of attack $\alpha_0$. The simulation parameters include the upstream velocity field $U_\infty(y)$, the kinematic viscosity of the fluid $\nu$, parameters governing number, spacing, etc. of vortices, spatial streamwise extent of the simulation and vortex method selection and accuracy options. For fixed wing craft, $U_\infty$ is constant along the length of the wing. If the lifting body is a helicopter rotor, a ship propeller blade, a fan, an aircraft propeller, or compressor blade, or the like, $U_\infty$ will vary along the length of the body. In the experiments which will be discussed, the wing parameters were constrained to alter the wing geometry only in the tip region of the wing, where longitudinal vorticity is strong and strongly feeds the roll-up process. In step 8, a table of perturbation functions or shapes are provided, including sawtooth and sinusoidal trailing-edge planform perturbations and damping functions. In step 2, the baseline wing geometry parameters, simulation parameters and constraints input in step 1 and the perturbation functions input in step 8 are run through a simulation algorithm, which uses fluid flow equations well known to those skilled in this art (see, for example, A. Leonard, "Computing Three-Dimensional Incompressible Flows With Vortex Elements," *Annual Review of Fluid Mechanics*, Vol. 17, pp. 523–559 (1985), and Lee and Donaldson & Bilanin, supra), to estimate the near wake vortex behavior of the baseline wing geometry. In step 3, the growth of the core of the simulated vortex is determined. In step 5 a target or goal core growth rate is input which is compared in step 4 to the simulated growth rate. In the experiments discussed below the goal was to achieve a perturbation which would provide an equivalent radius growth rate of twice the baseline rate within one-half of a chord downstream of the trailing edge. In step 4, a determination is made as to whether the goal has been reached. A history of the parameters which were used is saved in step 7, and if the goal has not been reached, at least one of the parameters relating to the perturbation function is modified in step 8 and the modified function is supplied to step 2. The process is then repeated until the goal radius growth rate is achieved.

When a determination is made in step 4 that the goal radius growth rate has been achieved, the parameters relating to the optimal wing are output in step 6.

Figure 9B:
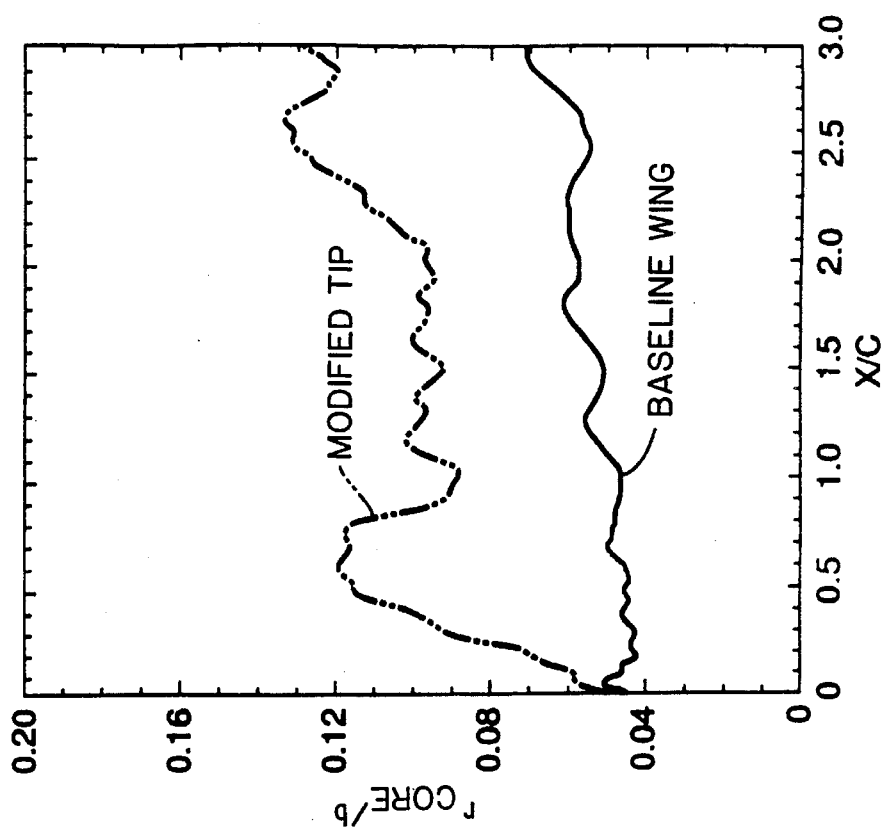
FIG. 9(a) shows a simulated baseline (prior art) planform wing geometry and a modified optimal planform wing geometry and FIG. 9(b) shows a simulated prediction of a tip-vortex growth for the modified and baseline wings.
Figure 9A:
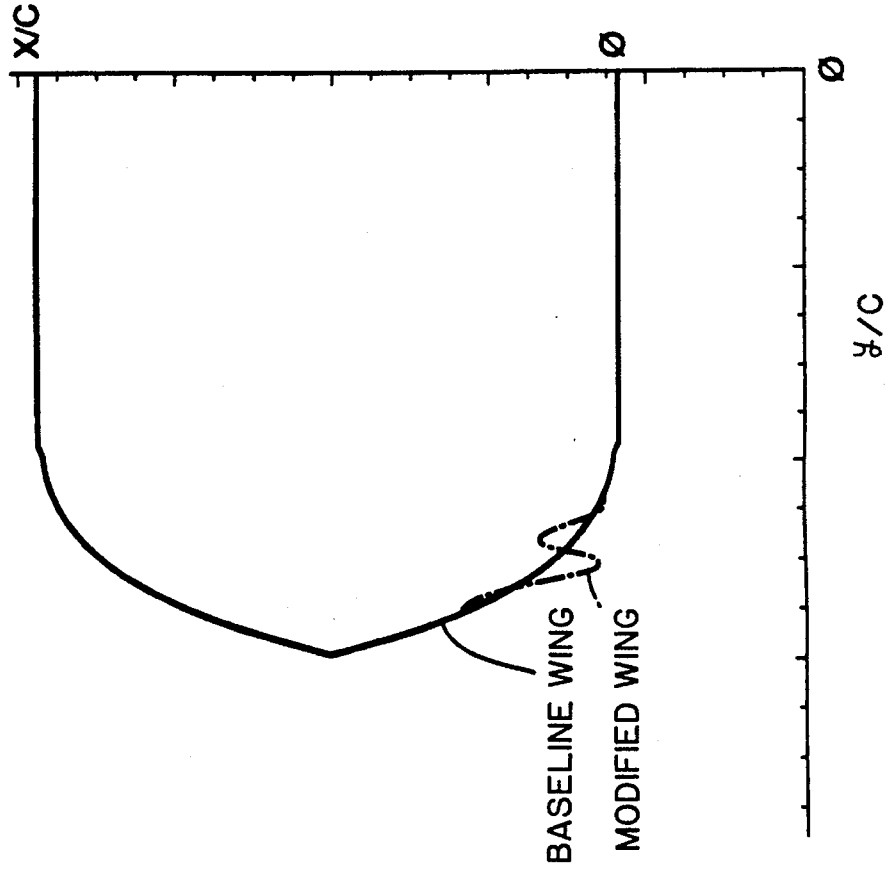

Hydrodynamic experiments were performed on a baseline model planform and a modified model planform shown in FIG. 9. The baseline model planform was inspired by a low aspect-ratio submarine sail. The modified model planform was developed from parameters output from the algorithm shown in FIG. 8. The wavenumber, amplitude and spanwise position of the perturbation which were selected by the algorithm were chosen to provide a predicted growth of the tip vortex to twice the unperturbed radius at one half chord length downstream of the trailing edge of the wing. The resultant planform wing is shown in FIG. 9(*a*). FIG. 9(*b*) shows the predicted growth for the modified-tip wing and the predicted growth for the baseline wing. In FIG. 9(*b*), $r_{core}/b$ is the equivalent radius $r_c$ (Equation 5) divided by the wingspan (y at the tip end of the wing).

Figure 10A:
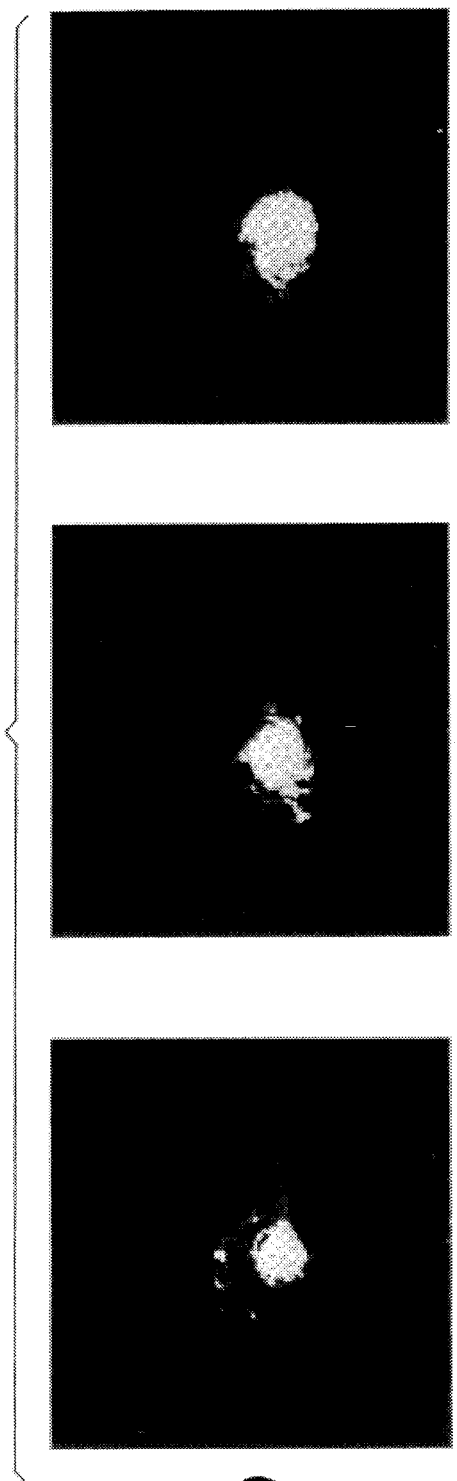
FIG. 10(a) and 10(b) show the vortices resulting from an experiment performed on a modified and a baseline wing, respectively.
Figure 10B:
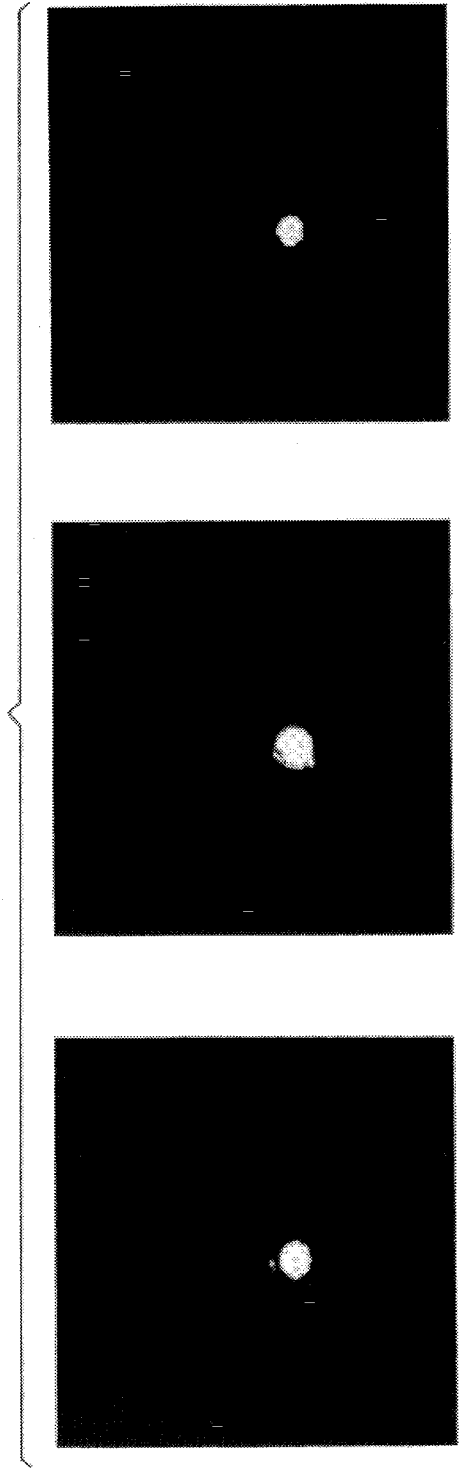

To experimentally illustrate the different vortex wakes, the baseline and modified models were simultaneously tested in a hydrodynamic lab water channel. As shown in FIG. 10(*b*), the baseline wing geometry provides a vortex having a small core radius compared to that for the modified wing which, as depicted in FIG. 10(*a*), showed a diffused core radius.

Figure 11B:
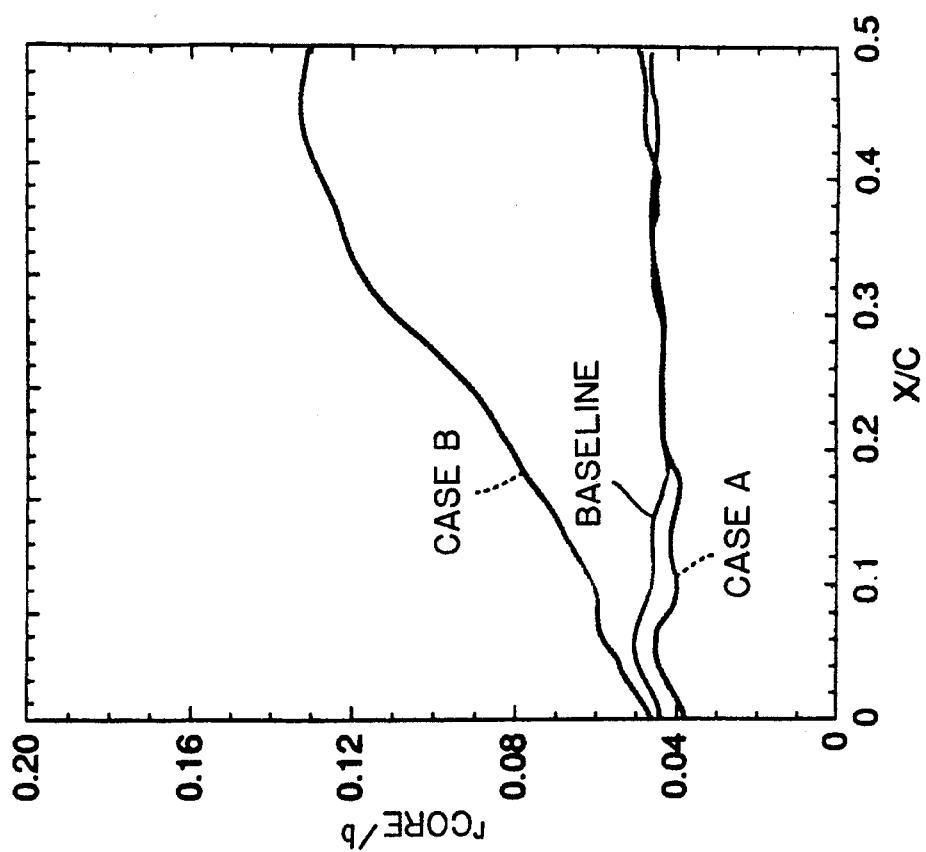
FIG. 11(a) shows a simulated baseline planform wing geometry and two modified planform wing geometries and FIG. 11(b) shows the simulated prediction of tip-vortex growth for the baseline wing geometry and the two modified wing geometries.
Figure 11A:
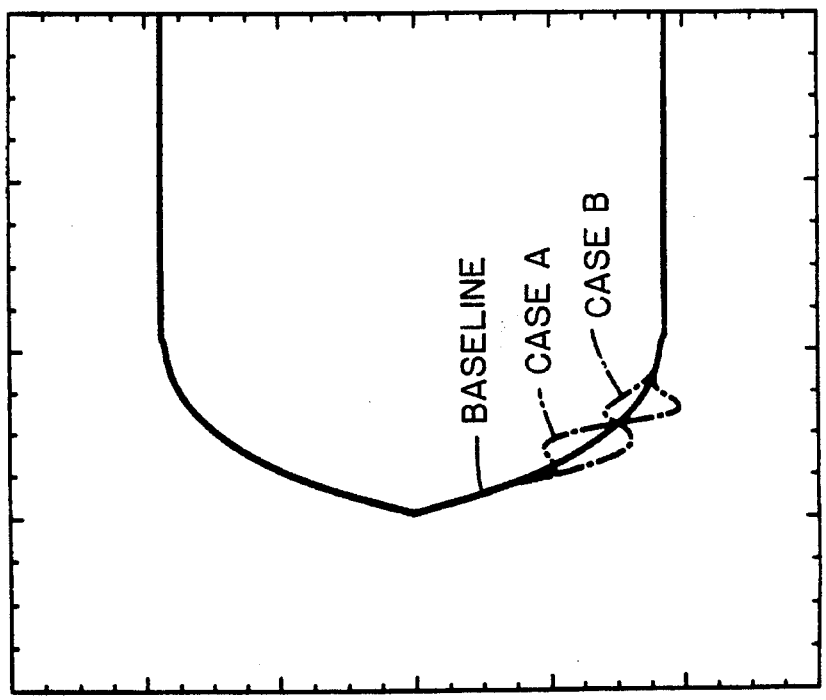

It should be noted that the mere presence of spanwise fluctuations in chord length near the tip end of the wing is not sufficient to induce increased vortex growth. For example, as shown in FIG. 11, the results of a simulated wing modification which did not result in the required growth in comparison to a baseline wing is shown in Case A. As shown in FIG. 11(*b*), the predicted growth of the vortex core in Case A is not significantly different from that of the baseline model. In comparison, the "inverted" alteration of the perturbation shown in Case B, which is simply a wave 180° out of phase with the perturbation of Case A, results in a high growth rate of the equivalent radius. Accordingly, it will be appreciated that the waveform, amplitude and location along the wing of the perturbation is critical to achieving the desired results.

Figure 12:
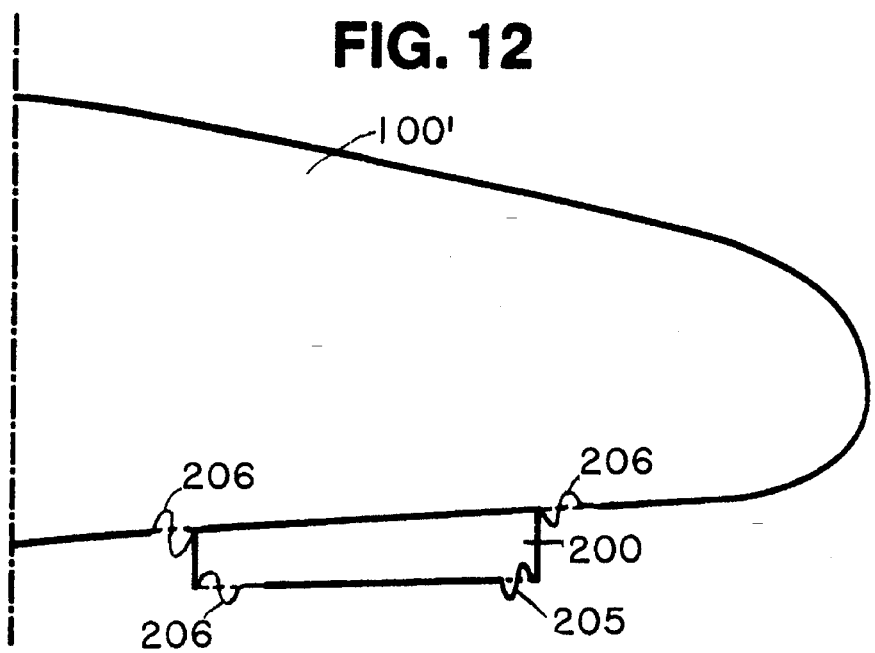
FIG. 12 is a wing having an extended flap incorporating the present invention.

FIG. 12 shows another environment in which the present invention is extremely useful. When aircraft are landing, the large vortices come from the extended flaps 200. By properly changing the lift distribution of the flaps, the present invention is capable of reducing these vortices. In the embodiment shown in FIG. 12, perturbations 205 are provided at the tips of the flap 200. In addition, perturbations 206 may be provided in the wing trailing edges where the flap intersects the wing. Therefore, the times between landings and subsequent take-offs and landings can be reduced with the arrangement shown in FIG. 12.

Figure 13:
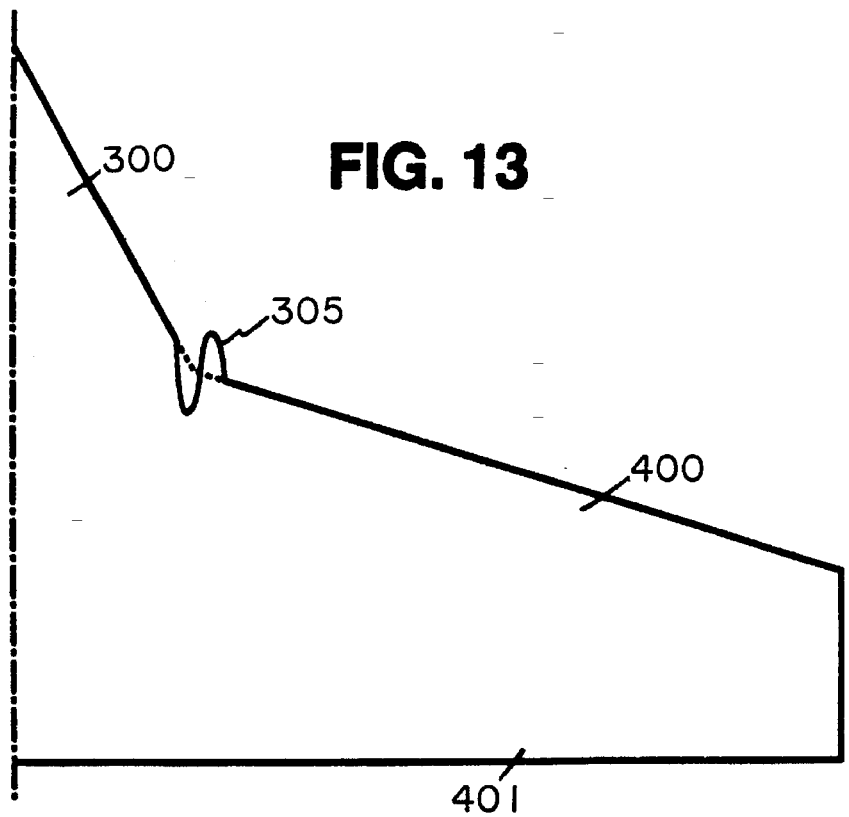
FIG. 13 is a double-delta wing incorporating the present invention.

FIG. 13 shows a double-delta wing, which is often used in military aircraft which operate at high angles of attack. As shown, at the joining point of separate wing 300 and main wing 400, a corner is formed, which acts as a wing tip to create a trailing vortex. This vortex mixes free stream fluid with boundary layer fluid along the wing to help keep the air flowing over the main wing attached when the aircraft is operated at high angles of attack. However, with this type of wing design, the effects of the fuselage on the vortex may cause the vortex to "burst" or cause a sudden and violent disturbance in the vortex flow at a point downstream of the trailing edge 401. This sudden burst of the vortex creates large unsteady forces which may stress components of the aircraft structure.

According to an embodiment of the invention as shown in FIG. 13, a perturbation 305 is provided at the point where separate wing 300 meets main wing 400. This perturbation in the wing destabilizes the vortex created at that point such that the spatial concentration of vorticity along the wing is adequate to keep the flow of air over the main wing 400 attached, and yet prevents vortex breakdown and burst due to increased growth of the equivalent radius.

Although the above-embodiments show a perturbation formed along the tip of the trailing edge of a wing surface, it is not necessary that the perturbation be provided at that point. For example, an appropriate perturbation could be provided elsewhere along the trailing edge, or even at a point along the leading edge. The only criteria which must be met is that the lift distribution result in a vorticity having an enhanced velocity component of the fluid flow directed outwardly from the centroid of the vortex field.

Of course, it will be appreciated that the invention may take forms other than those specifically described, and the scope of the invention is to be determined solely by the following claims.

What is claimed is:

1. In a predetermined lifting body for moving relative to a fluid medium, the relative motion being in an x-direction defined as the direction of a velocity vector of the fluid medium relative to said lifting body upstream thereof, wherein said lifting body has a predetermined planform with a chord length in the x-direction, said chord length being defined as a predetermined function c(y) that provides a predetermined lift distribution in a y-direction normal to the x-direction to create in the fluid medium a vortex field having a predetermined total vorticity at any given location downstream of said lifting body, wherein such total vorticity is represented by an equivalent vortex with a center at a centroid of the vortex field and a radius in a plane normal to the x-direction, the equivalent vortex having the same total vorticity as the vortex field at the same given location and the radius having a rate of growth in the x-direction depending on a fluid velocity component of the equivalent vortex directed outwardly from the centroid of the vortex field, the improvement comprising:

a perturbation in said lifting body that changes the periphery of said predetermined planform to vary c(y) only in a region of said lifting body and thereby alter said predetermined lift distribution to enhance the fluid velocity component of the equivalent vortex directed outwardly from the centroid of the vortex field and increase the rate of growth of the radius of the equivalent vortex in the x-direction.

2. A lifting body according to claim 1, wherein said lifting body is a control surface.

3. A lifting body according to claim 2, wherein said control surface is a submarine control surface.

4. A lifting body according to claim 2, wherein said control surface is an aircraft control surface.

5. A lifting body according to claim 1, wherein said lifting body has a root end for attachment to a supporting body and a tip end for extending into the fluid medium and said perturbation is disposed at a trailing edge of said tip end of said lifting body.

6. A lifting body according to claim 5, wherein said lifting body is a airfoil and said perturbation is a damped sine wave having the formula $P=a_o e^{-d_o z^2} \sin kz'$ wherein z' is a distance measured along a coordinate axis formed by the outline of said planform without said perturbation, z'=0 being defined as the start of said perturbation along said outline, P is the distance along an axis perpendicular to the z' axis, and $a_o$, $d_o$ and k are factors chosen to provide said predetermined lift distribution.

7. A lifting body according to claim 1, wherein said lifting body selected from the group consisting of a helicopter rotor, a ship propellor blade, a fan blade, an aircraft propellor blade and a compressor blade.

8. A lifting body according to claim 1, wherein the total lift generated by said predetermined planform with said perturbation is substantially the same as the total lift generated by said predetermined planform without said perturbation.

9. A lifting body according to claim 1, wherein said perturbation is disposed at a leading edge of said lifting body.

10. A lifting body according to claim 9, wherein said lifting body has a double-delta planform with at least two delta wing portions intersecting at a leading edge of said lifting body and said perturbation is disposed at said intersection of said two delta wing portions.

11. A lifting body according to claim 1, wherein said perturbation is disposed in a tip region of said lifting body.

12. A lifting body according to claim 1, wherein said lifting body is an aircraft wing.

13. A lifting body according to claim 1, wherein said lifting body is an aircraft flap and said perturbation is provided at two tip ends of said flap.

14. A lifting body according to claim 1, wherein said lifting body is a submarine sail.

15. In a predetermined lifting body for moving relative to a fluid medium, the relative motion being in an x-direction defined as the direction of a velocity vector of the fluid medium relative to said lifting body upstream thereof, wherein said lifting body and a velocity vector of the fluid medium form a predetermined angle of attack α between a chord of said lifting body and a velocity vector of the fluid medium in the x-direction, said angle of attack being defined as a predetermined function α(y) that provides a predetermined lift distribution in a y-direction normal to the x-direction to create in the fluid medium a vortex field having a predetermined total vorticity at any given location downstream of said lifting body, wherein such total vorticity is represented by an equivalent vortex with a center at a centroid of the vortex field and a radius in a plane normal to the x-direction, the equivalent vortex having the same total vorticity as the vortex filed at the same given location and the radius having a rate of growth in the x-direction depending on a fluid velocity component of the equivalent vortex directed outwardly from the centroid of the vortex field, the improvement comprising:

a twist in said lifting body that changes said predetermined angle of attack to vary α(y) only in a region of said lifting body and thereby alter said predetermined lift distribution to enhance the fluid velocity component of the equivalent vortex directed outwardly from the centroid of the vortex field and increase the rate of growth of the radius of the equivalent vortex in the x-direction.

16. A lifting body according to claim 15, wherein said lifting body has a root end for attachment to a supporting body and a tip end for extending into the fluid medium.

17. A lifting body according to claim 15, wherein the total lift generated by said predetermined lifting body with said twist is substantially the same as the total lift generated by said predetermined lifting body without said twist.

18. A lifting body according to claim 15, wherein said lifting body is an aircraft wing.

19. A lifting body according to claim 15, wherein said lifting body is selected from the group consisting of a helicopter rotor, a ship propeller blade, a fan blade, an aircraft propeller blade and a compressor blade.

* * * * *